United States Patent [19]

Ikeda

[11] Patent Number: 5,729,630
[45] Date of Patent: Mar. 17, 1998

[54] IMAGE PROCESSING METHOD AND APPARATUS HAVING CHARACTER RECOGNITION CAPABILITIES USING SIZE OR POSITION INFORMATION

[75] Inventor: Hiroaki Ikeda, Yokohama, Japan

[73] Assignee: Canon Kabushiki Kaisha, Tokyo, Japan

[21] Appl. No.: 348,833

[22] Filed: Nov. 29, 1994

Related U.S. Application Data

[63] Continuation of Ser. No. 22,437, Feb. 16, 1993, abandoned, which is a continuation of Ser. No. 698,274, May 10, 1991, abandoned.

[30] Foreign Application Priority Data

| May 14, 1990 | [JP] | Japan | 2-124891 |
| Aug. 24, 1990 | [JP] | Japan | 2-221023 |

[51] Int. Cl.⁶ .................................................. G06K 9/62
[52] U.S. Cl. ........................................ 382/229; 382/292
[58] Field of Search ............................. 382/23, 25, 28, 382/36, 40, 48, 201, 203, 206, 224, 229, 292

[56] References Cited

U.S. PATENT DOCUMENTS

| 4,860,376 | 8/1989 | Tanka et al. | 382/57 |
| 4,907,283 | 3/1990 | Tanaka et al. | 382/40 |
| 5,048,113 | 9/1991 | Yamagata et al. | 382/57 |
| 5,138,668 | 8/1992 | Abe | 382/9 |
| 5,150,424 | 9/1992 | Aguro et al. | 382/13 |

FOREIGN PATENT DOCUMENTS

| 55-82382 | 6/1980 | Japan | 382/36 |
| 55-138179 | 10/1980 | Japan | 382/40 |
| 61-74087 | 4/1986 | Japan | 382/40 |
| 63-78287 | 4/1988 | Japan | G06K 9/62 |
| 1-291394 | 11/1989 | Japan | 382/25 |
| 2-039388 | 2/1990 | Japan | 382/25 |
| 2-62682 | 3/1990 | Japan | 382/36 |
| 2-224084 | 9/1990 | Japan | 382/36 |
| 2-285477 | 11/1990 | Japan | 382/36 |
| 2218839 | 11/1989 | United Kingdom | 382/28 |

OTHER PUBLICATIONS

English Translation of Japanese Kokai 1–291394, Ishizaki et al., Nov. 1989.
English Translation of Japanese Kokai 2–285477, Mori, Nov. 1990.
English translation of Japanese Kokai 55–82382, to Tanaka et al., Jun. 21, 1980.
English translation of Japanese Kokai 63–78287, to Hiroe Fujiwara, Apr. 8, 1988.

*Primary Examiner*—Andrew Johns
*Attorney, Agent, or Firm*—Fitzpatrick, Cella, Harper & Scinto

[57] ABSTRACT

An image processing apparatus comprises: a character area extractor to extract a character area from image information which is derived by reading an original document by an image scanner; a position/size information memory to derive position information and size information of the image information in the character area extracted by the extractor; a comparator to compare the position and size information which are stored in the memory with predetermined standard information; and a recognizer to decide a recognition character on the basis of a comparison result obtained by the comparator. The predetermined standard information indicates a ratio in the extracted character area. In the case of correcting the recognition character, the predetermined standard information is updated to a value which is compared by the comparator.

36 Claims, 12 Drawing Sheets

| 1 | ア , ァ | DICTIONARY ア |
| 2 | イ , ィ | DICTIONARY イ |
| 6 | カ , ヵ | DICTIONARY カ |
| 7 | ガ | DICTIONARY ガ |
| 8 | キ | DICTIONARY キ |
| k | ツ , ッ | DICTIONARY ツ |
| l | ト | DICTIONARY ト |
| m | ヨ , ョ | DICTIONARY ヨ |
| n | ン | DICTIONARY ン |

| CATEGORY NO. | BIT OFF | BIT ON |
|---|---|---|
| 1 | ア | ァ |
| 2 | イ | ィ |
| 6 | カ | ヵ |
| k | ツ | ッ |
| m | ヨ | ョ |

| u < v | u > v |
|---|---|
| ' | , |

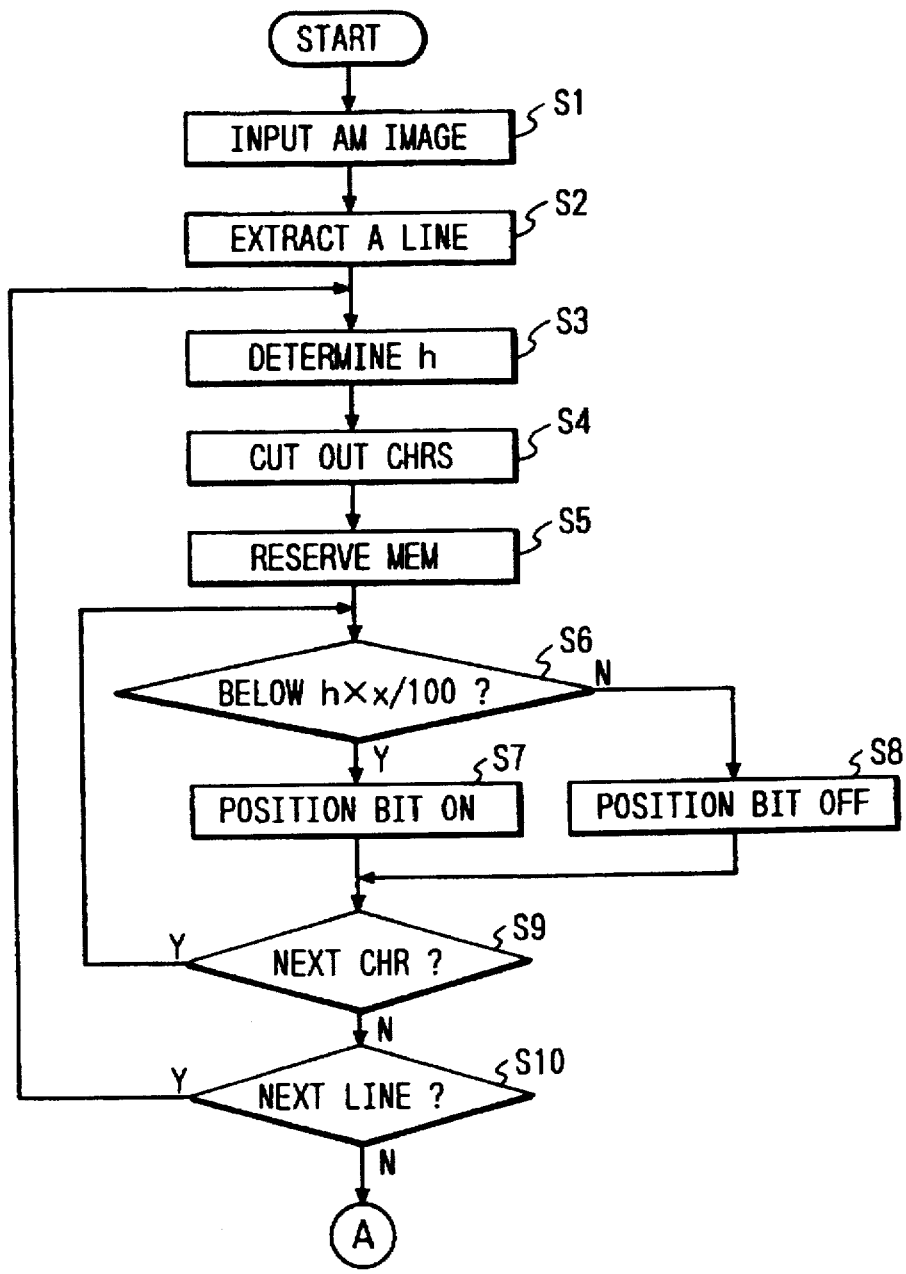

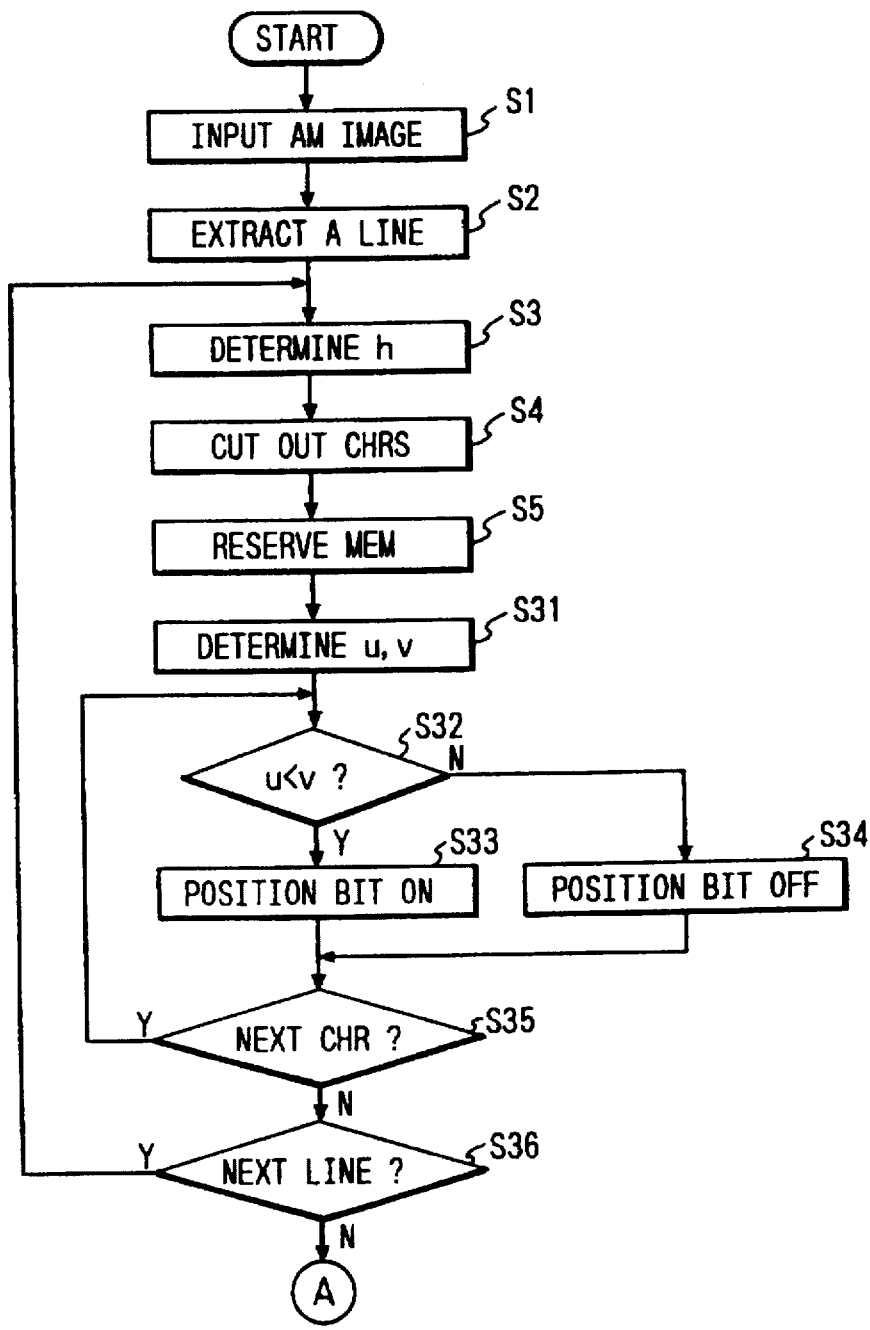

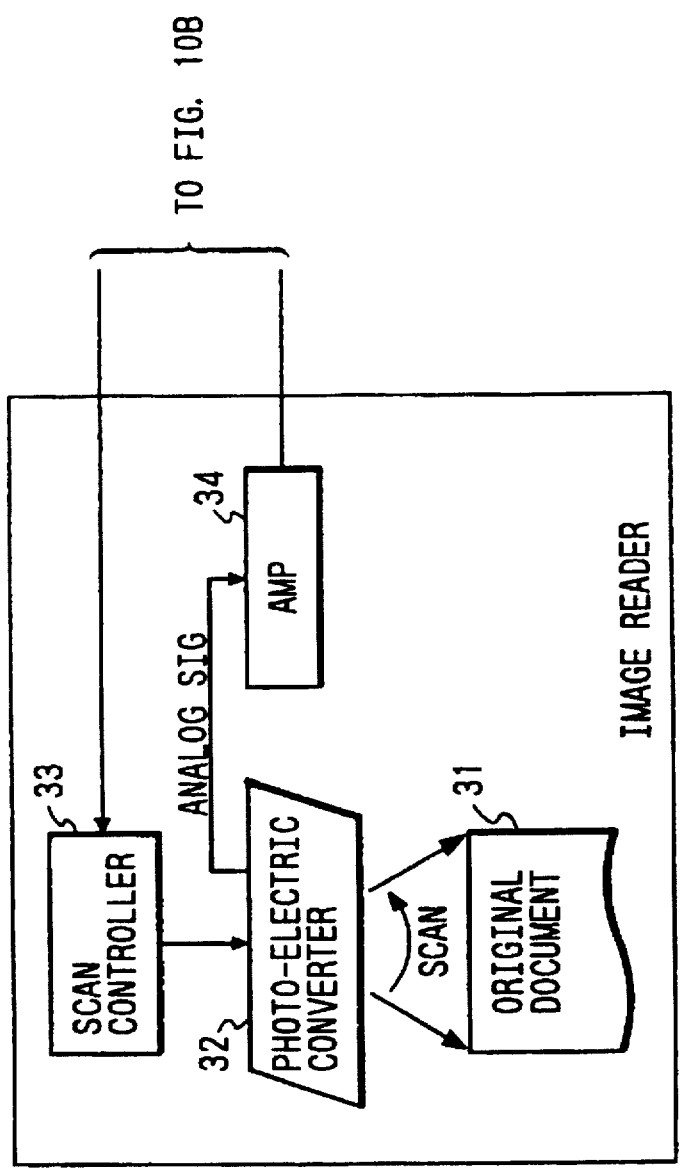

70 CHR CUTTING FRAME

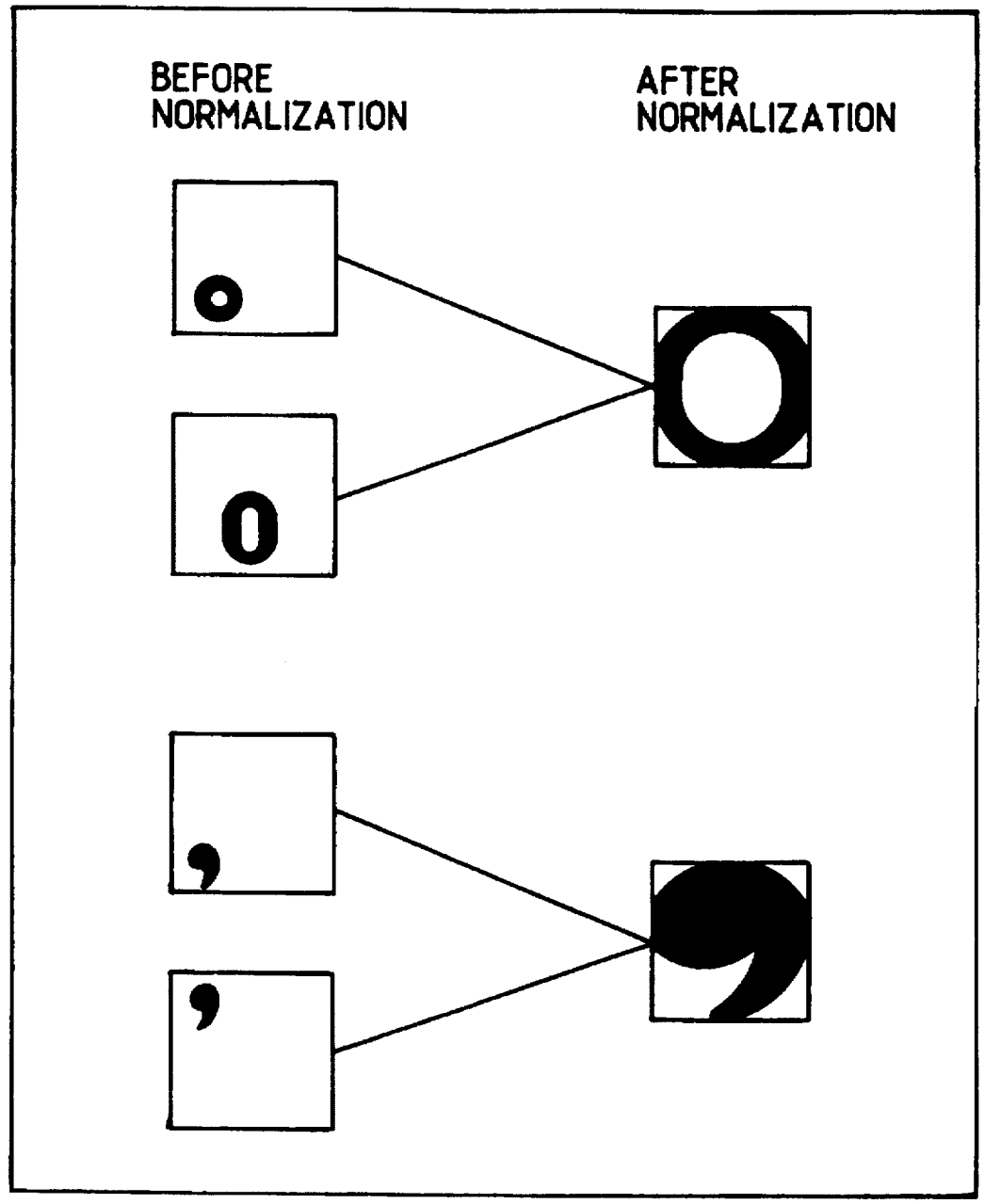

1

IMAGE PROCESSING METHOD AND APPARATUS HAVING CHARACTER RECOGNITION CAPABILITIES USING SIZE OR POSITION INFORMATION

This application is a continuation of application Ser. No. 08/022,437, filed Feb. 16, 1993, now abandoned, which was a continuation of application Ser. No. 07/698,274, filed May 10, 1991, also now abandoned.

BACKGROUND OF THE INVENTION

1. Field of the Invention

The present invention relates to image processing method and apparatus for recognizing an input image and, more particularly, to image processing method and apparatus for correctly discriminating similar character and figure.

2. Related Background Art

FIG. 13 is a flowchart showing character recognizing processes in a conventional general character recognizing apparatus. In such a character recognizing apparatus, an original is read by using a photoelectric converter such as an image scanner and is converted into binary image data (step S141). In the next step S142, a character image of one character is cut out from the input image which has been converted into a binary image. The above process is executed by first extracting a line from a pixel distribution in the line direction and subsequently examining a pixel distribution in the direction perpendicular to the line. Then, a normalization is performed in step S146 in order to absorb a fluctuation in size of the cut-out character image. After that, a feature of the normalized character image is extracted in step S147. With respect to the normalized image whose feature has been extracted, a degree of similarity is calculated in step S148 with reference to a dictionary 53 which has been prepared. A character having the largest degree of similarity is selected as a result of the recognition. The result of the recognition is finally displayed in step S51.

However, in the above conventional method, characters (including symbols) in which the character images after completion of the normalization are extremely similar such as "." (period) and "o" (small letter of O) or "," (comma) and "'" (apostrophe) or the like as shown in FIG. 14 occur as a result of the normalization. Thus, there is a drawback such that an erroneous recognition occurs between such similar characters.

However, in the above conventional method, since the size of cut-out character is normalized upon recognition, it is difficult to distinguish similar characters such as "ツ" (reads "tsu" and "ッ" (also reads "tsu") in which the shapes are the same and only the sizes are different. On the other hand, in the dictionary, those similar characters are handled as different categories. Therefore, there is a drawback such that "ッ" is generated as a result of the recognition even if an input character is "ツ" or, contrarily, "ツ" is generated as a recognition result even if an input character is "ッ".

SUMMARY OF THE INVENTION

It is an object of the invention to solve the above drawbacks in the conventional method and to provide an image processing method whereby position information of characters which have been cut out as objects to be recognized are previously stored, similar characters are previously stored as one category, and in the case where the similar characters are included in candidate characters which are derived as a

2 recognition result, the recognition result is determined in consideration of the stored position information as well.

Another object of the invention is to solve the above drawbacks in the conventional method and to provide an image processing method whereby information regarding sizes and positions of characters which have been cut out as objects to be recognized are compared with predetermined standard information and a recognition result of image data is decided on the basis of a comparison result.

BRIEF DESCRIPTION OF THE DRAWINGS

FIG. 8 comprising FIGS. 8A and 8B is a flowchart showing processes for storing similar characters as one category and for discriminating "ツ" and "ッ";

FIG. 9 comprising FIGS. 9A and 9B is a flowchart showing processes for storing similar characters as one category and for discriminating "" and ",";

FIG. 10 comprising FIGS. 10A and 10B is a block diagram showing a construction of an image processing apparatus in an embodiment in the case of discriminating similar characters on the basis of information regarding sizes and positions of characters which have been cut out;

FIG. 14 is a diagram for explaining the normalization of image information which has been cut out.

DETAILED DESCRIPTION OF THE PREFERRED EMBODIMENTS

Figure 1:
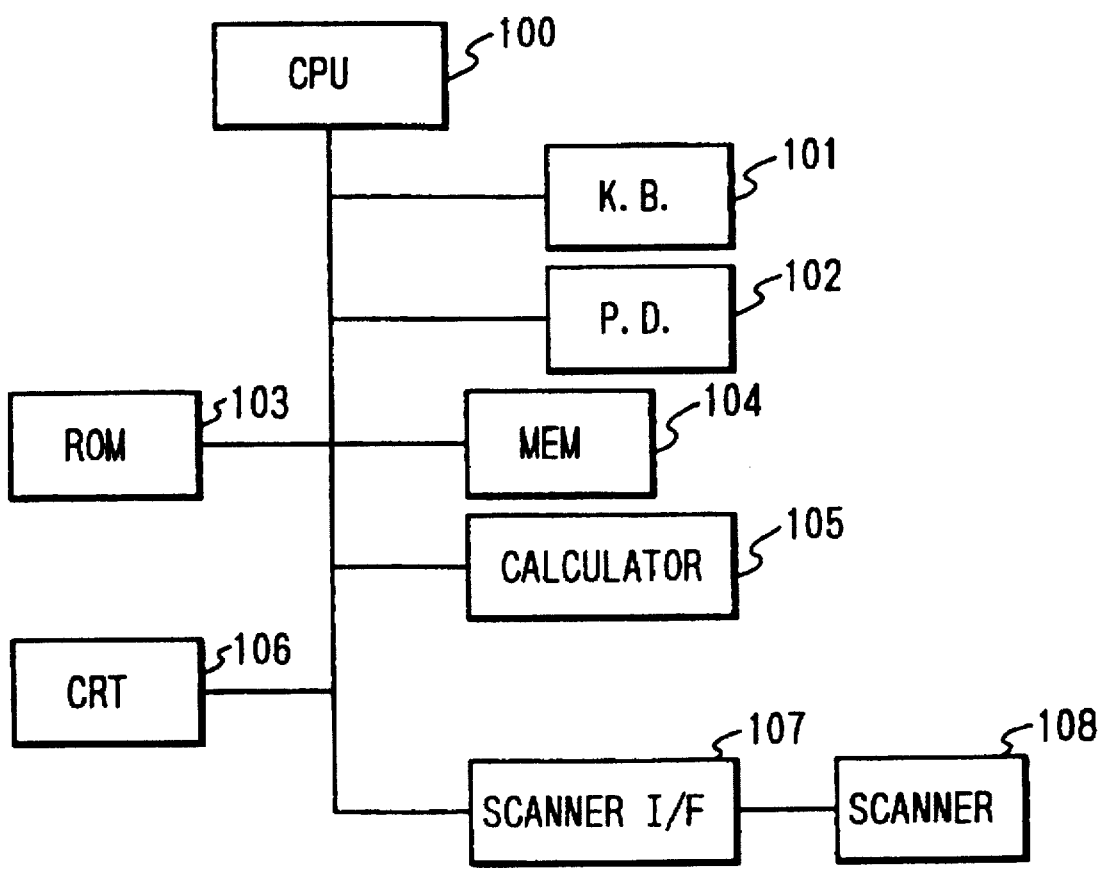
FIG. 1 is a fundamental constructional diagram of an example in the case of embodying the invention by storing similar characters as one category.

Embodiment in the case where similar characters or figures are stored as one category and a recognition result is decided from position information in image information as an object to be recognized FIG. 1 is a diagram showing a fundamental construction in the embodiment. Reference numeral 100 denotes a central processing unit (CPU) to execute arithmetic operations in flowcharts shown in FIGS. 8 and 9 and the like; 101 a keyboard for inputting characters, symboles, or the like, for instructing a correction upon erroneous recognition, or the like; 102 a pointing device; 103 a read only memory (ROM)

in which a dictionary or the like which is used when characters are recognized has been stored; 104 a memory to store data which has been read by a scanner 108; 105 a calculator for finding out candidate words or the like from the data which has been read by the scanner 108 and for calculating a degree of similarity of each word; 106 a CRT; 107 an interface of the scanner 108; and 108 the scanner to read image information.

Figure 2:
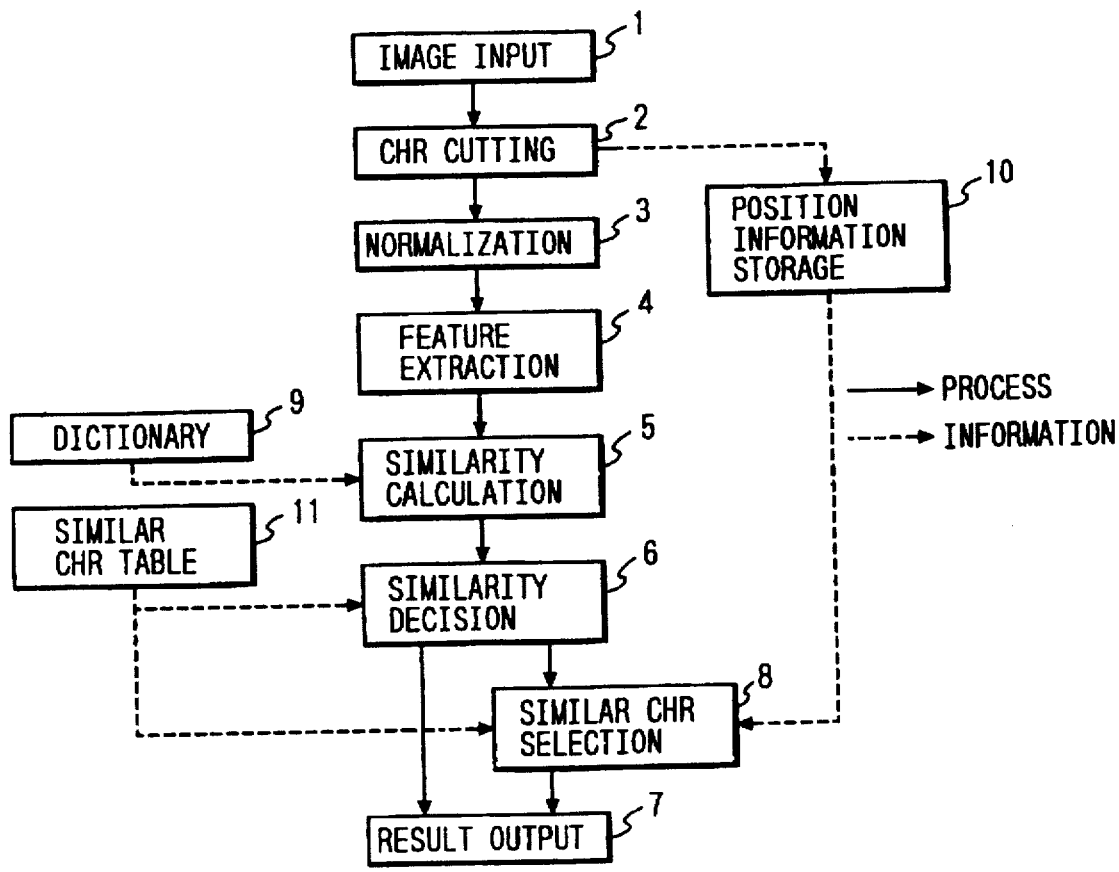
FIG. 2 is a block diagram showing a flow of processes and information in a recognizing apparatus in the embodiment in the case of storing similar characters as one category.

FIG. 2 is a block diagram most clearly showing features of the embodiment. In an image input section 1, an image is input from the image scanner 108 or the like. In a character cutting-out section 2, characters are cut out one by one from the input image by the CPU 100. In a normalization section 3, circumscribed rectangles of the characters which have been cut out by the CPU 100 are obtained and are normalized and are expanded or contracted to a predetermined size. In a feature extraction section 4, features of the character images which have been normalized by the CPU 100 are extracted. In a similarity calculation section 5, degrees of similarity are calculated by using the features extracted by the calculator 105 and a dictionary 9 stored in the ROM 103. In a similarity decision section 6, a check is made to see if similar characters exist or not by using a similar character table 11 stored in the ROM 103. In the character cutting-out section 2, the position information of the characters upon cutting-out has been stored into the memory 104 in a position information storage section 10. Therefore, in a similar character selection section 8, either one of the similar characters is selected by the CPU 100 on the basis of the character position information. In a result output section 7, a result of the recognition is supplied to the CRT 106.

A flow of the processes for discriminating similar characters of different sizes such as "ア" (reads "a") and "ｱ" (also reads "a") which are executed by the CPU 100 will now be described in detail with reference to a flowchart shown in FIG. 8.

Figure 3:
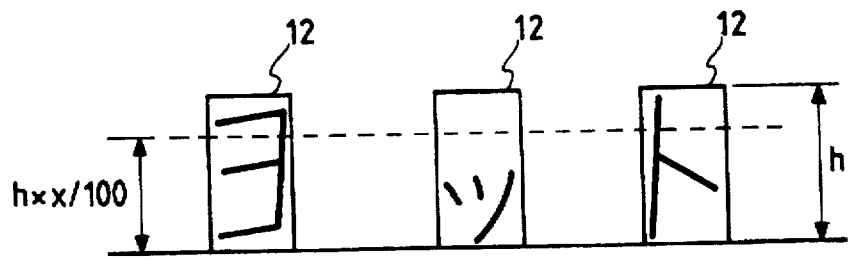
FIG. 3 is an explanatory diagram for a cutting process of characters in an input image and an extracting process of position information.
Figures 4, 5, 6, 7:
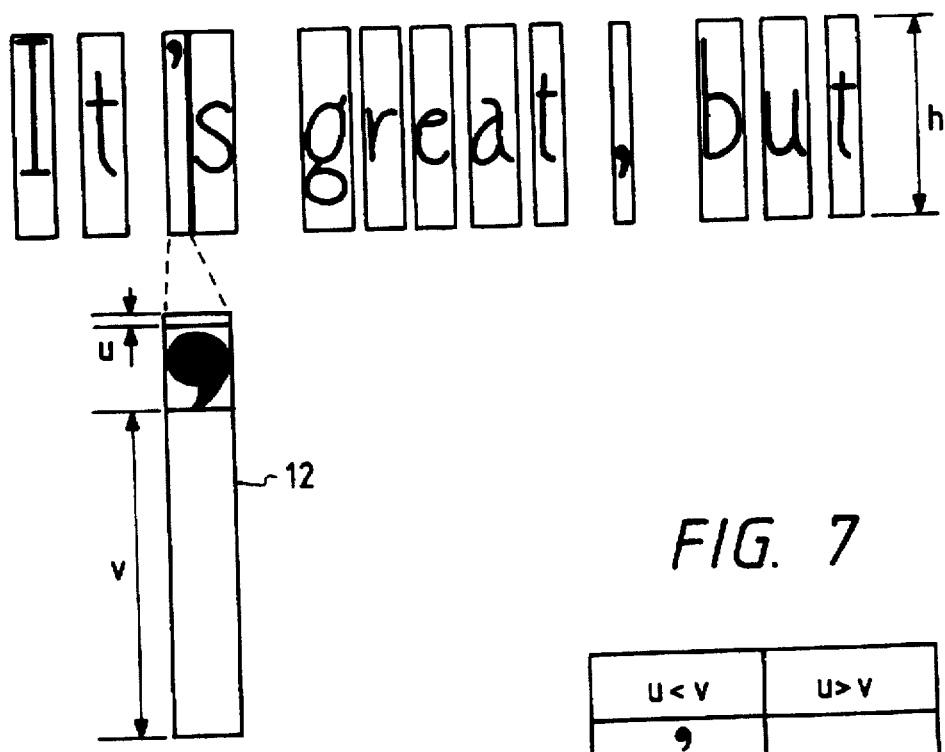
FIG. 4 is a diagram showing an example of a dictionary to store similar characters as one category.
FIG. 5 is a diagram showing an example of a similar character table.
FIG. 6 is a diagram for explaining a character cutting process and a position information extracting process by using "" and ","
FIG. 7 is a diagram showing conditions when similar characters are selected.

An image is input from the scanner 108 (step S1). A line is extracted from the input image information (step S2). A height h of line as shown in FIG. 3 is obtained (step S3). Characters as shown in FIG. 3 are subsequently cut out (step S4). If the number of characters existing on the line has been known by cutting out the characters, bits indicative of a status of characters in the lower portion as many as the number of input characters are reserved in a position information storage section in the memory 104 (step S5). A check is made to see if a pixel in the top portion of the character exists below a height of $$h \times \frac{x}{100}$$

or not (step S6). If the pixels exist below a height of x%, it is decided that such a character is a lower character and a bit of the position information ("position bit") is turned on (step S7). If NO in step S6, the position bit is turned off (step S8). If there is a next character (step S9), the processing routine is returned to step S6. If a next character doesn't exist (step S9), the process advances to a next line. If there is a next line (step S10), the processing routine is returned to step S3 and the processes in steps S3 to S10 are repeated until the last line. If a next line doesn't exist (step S10), the smallest one of rectangles which enclose the cut-out character image is normalized (step S11). A feature of the character is extracted (step S12). A similarity is calculated by the calculator 105 (step S13). The dictionary 9 which is used for the similarity calculation has been stored in the ROM 103 as shown in FIG. 4. Category numbers (1 to n) are assigned to the characters whose sizes can be distinguished in a manner such that two characters are regarded as one category. If the cut-out character has been discriminated and the degree of similarity could be calculated (step S13), a check is made to see if the category of the maximum degree of similarity exists in the similar character table or not (step S14). The similar character table 11 has been stored in the ROM 103 as shown in FIG. 5. The categories when the position bit is on and when it is off are respectively included in the dictionary 9 with respect to the category number in which similar characters exist.

An example of FIG. 3 will now be described. It is now assumed that the result of the similarity calculation section 5 indicates the category numbers "m, k, l". At this time, the bits of "off, on, off" are stored in the position information storage section. Since the category number m is included in the similar character table 11, it is determined by the similarity decision section 6 that the similar characters are included. In the similar character selection section 8, the category number is m and the bit is off, that is, the character is recognized as "ヨ" (reads "yo". Similarly, in the case of the category number k as well, the similar characters are included and the bit is on, so that the character is recognized as "ッ" (reads "tsu") of a small letter. In the case of the category number l, it is decided by the similarity decision section 6 that no similar character exists, so that the character is recognized as "ト" (reads "to"). If it is determined in step S14 that the category of the maximum similarity doesn't exist in the similar character table, the category whose similarity has been discriminated to be maximum in step S13 is used as a recognition result. If YES in step S14, a check is further made in step S16 to see if the position bit in the memory 104 has been turned on or not.

If it is decided in step S16 that the bit is on, a small letter of the category in the similar character table 11 is used as a recognition result. If NO in step S16, a capital letter of the category in the similar character table 11 is used as a recognition result. After the recognition results were obtained in steps S15, S17, and S18, a check is now made to see if a next character exists or not (step S19). If YES, the processing routine is returned to step S11 and the processes in steps S11 to S19 are repeated until the last character. If NO in step S19, the recognition result is displayed by the CRT 106 (step S20).

A flow of the processes for discriminating similar characters such as "″" and "," whose positions are different which are executed by the CPU 100 will now be described in detail with reference to a flowchart shown in FIG. 9.

Figure 9B:
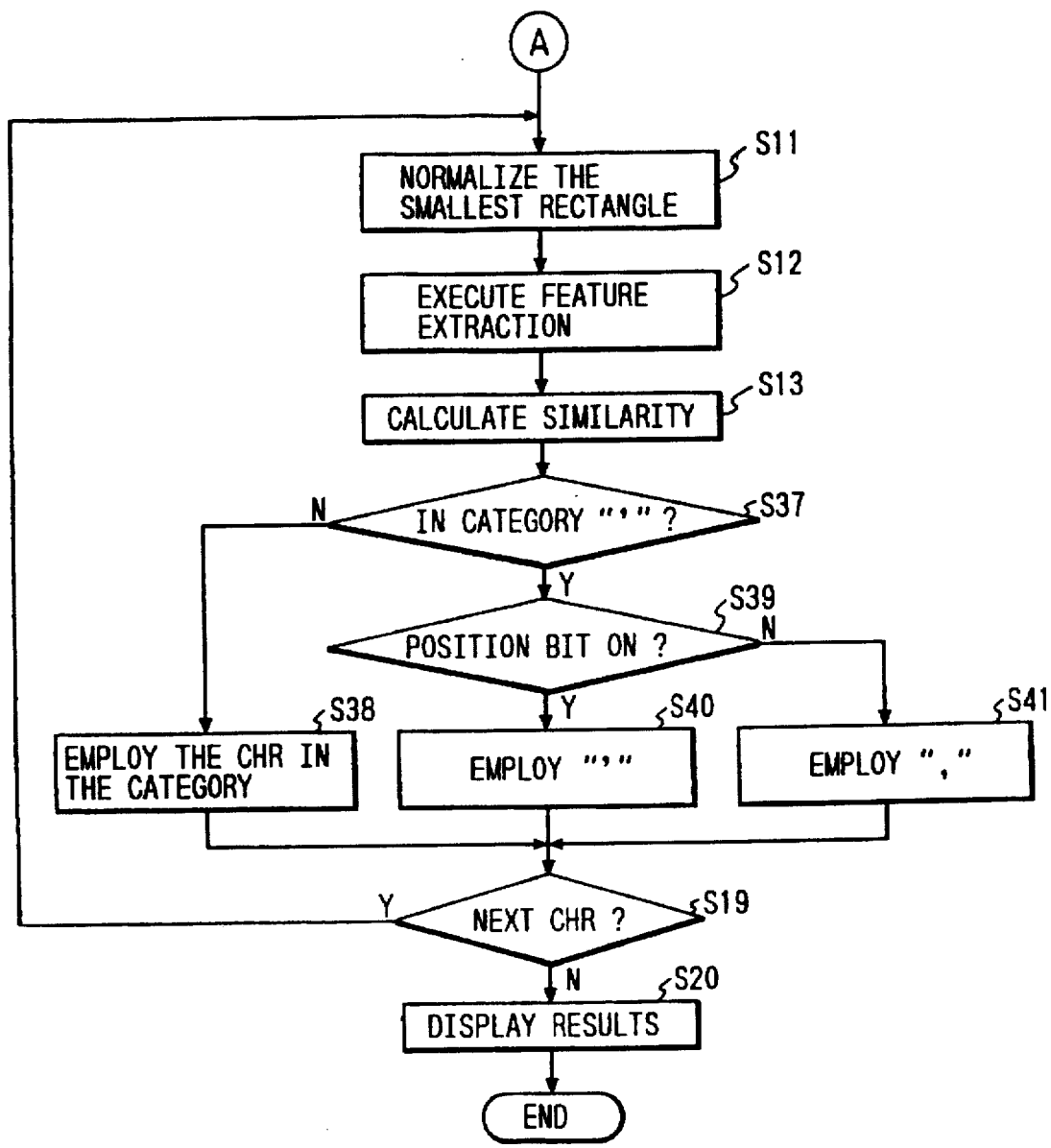

Since the processes in steps S1 to S4, S11 to S13, S19, and S20 in FIG. 9 are similar to those in the first embodiment, their descriptions are omitted here.

Figure 8B:
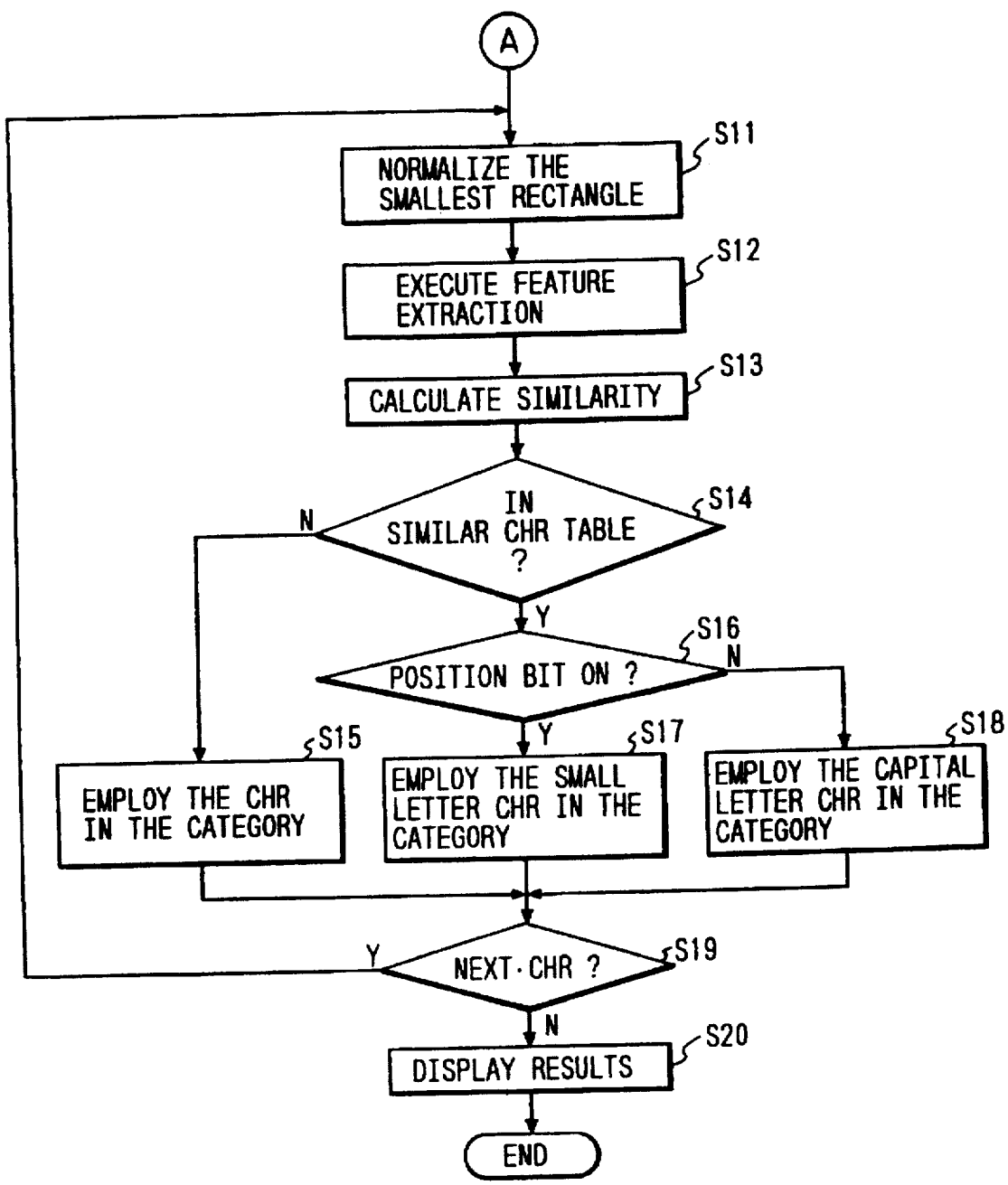

In a manner similar to the processes shown in FIG. 8, characters are cut out (step S4), a length u from the upper portion of a cutting frame of the cut-out character to the upper portion of the character and a length v from the lower portion of the character to the lower portion of the cutting frame as shown in FIG. 6 are obtained (step S31), and the values of u and v are stored into the position information storage section 10 in the memory 104 and are compared (step S32). If u is smaller than v in step S32, the position bit which has been reserved in step S5 is turned on (step S33). If u is equal to or larger than v in step S32, the position bit is turned off (step S34). A check is then made to see if a next character exists or not (step S35). If YES, the processing routine is returned to step S32 and the processes in steps S32 to S35 are repeated until the last character. If NO in step S35, step S36 follows and a check is made to see if there is a next line or not. If there is a next line, the processing routine is returned to step S3 and the processes in steps S3 to S36 are repeated until the last line. If NO in step S36, step S11 follows.

After the similarity of the character was calculated in step S13, a check is made to see if the category of the maximum similarity belongs to the category of "'" or not (step S37). If NO in step S37, the category of the maximum similarity is used as a recognition result (step S38). If YES in step S37, a check is made to see if the position bit in the memory 104 has been turned on or not (step S39). If YES in step S39, "'" is used as a recognition result (step S40). If NO in step S39 "," is used as a recognition result (step S41).

The discrimination regarding characters having the same feature and different character positions which is executed on the basis of the relation between u and v which are derived in a manner similar to the above can be also performed to characters other than "'" and "," by providing a table as shown in FIG. 7.

Figure 10B:
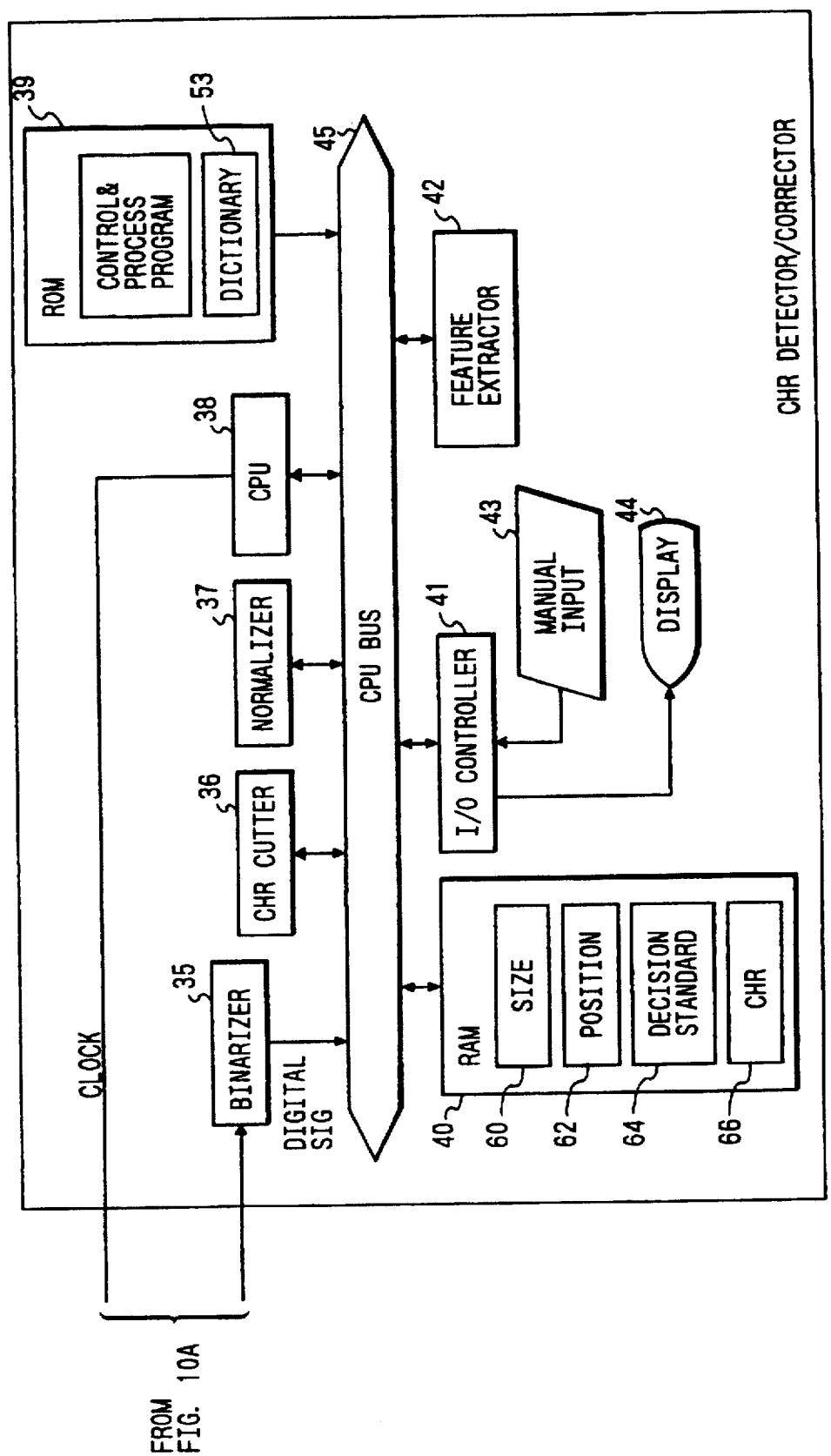

Embodiment in which information regarding a size and a position of image information which has been cut out is compared with standard information and a recognition result is determined FIG. 10 is a block diagram showing a construction of a character recognizing apparatus which can automatically correct a character which has erroneously been recognized according to the embodiment. In FIG. 10, the character recognizing apparatus comprises an image reading section and a character detector/corrector. Further, the image reading section comprises: a photoelectric converter 32 such as an image scanner or the like; a scan controller 33; and an amplifier 34. The character detector/corrector comprises: a binarizer 35; a character cutter 36; a normalizer 37; a CPU 38; an ROM 39; an RAM 40; an input/output (I/O) controller 41; a feature extractor 42; a manual input section 43; a display section 44; and a CPU bus 45. In addition to the dictionary 53, processing programs for executing processes, which will be explained hereinlater, such as calculation of a standard character size, extraction of size and position information, calculation of a similarity, decision regarding the correction, automatic correction, and the like have been stored in the ROM 39.

In the above character recognizing apparatus, an original document 31 is read by the photo-electric converter 32 such as an image scanner or the like. After that, an output of the converter 32 is amplified by the amplifier 34 and is converted from the analog signal into the binary digital data by the binarizer 35. Then, characters are cut out one by one by the character cutter 36. Size and position information of the cut-out characters, which will be explained hereinlater, are extracted. After that, the characters are normalized and features of the characters are extracted. Subsequently, by selecting the character which is most similar to the normalized character with reference to the dictionary stored in the ROM 39, the character is recognized.

Figure 11:
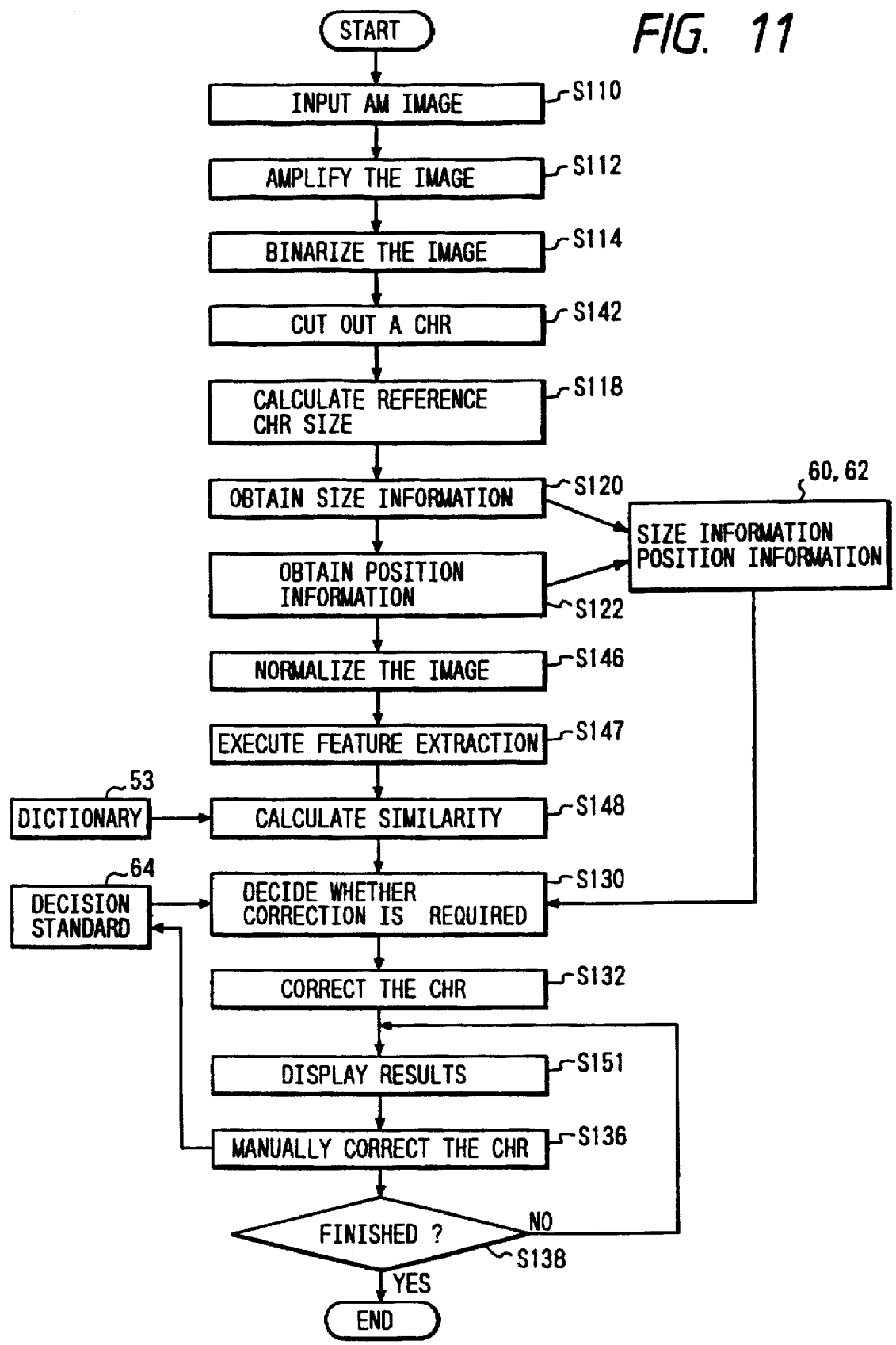
FIG. 11 is a flowchart showing processes in the image processing apparatus shown in FIG. 10.

Processes for recognizing characters and for automatically correcting the erroneously recognized characters in the embodiment will now be described with reference to a flowchart shown in FIG. 11. In the flowchart shown in FIG. 11, the same processing steps as those in the conventional method are designated by the same step numbers and their descriptions are omitted here on the assumption that those processing steps are based on the conventional technique.

Figure 12:
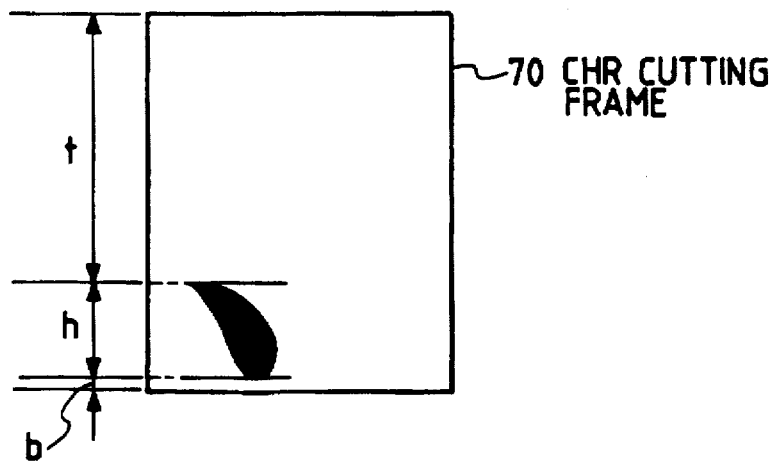
FIG. 12 is a diagram for explaining size information and position information of characters in image information which has been cut out.
Figure 13:
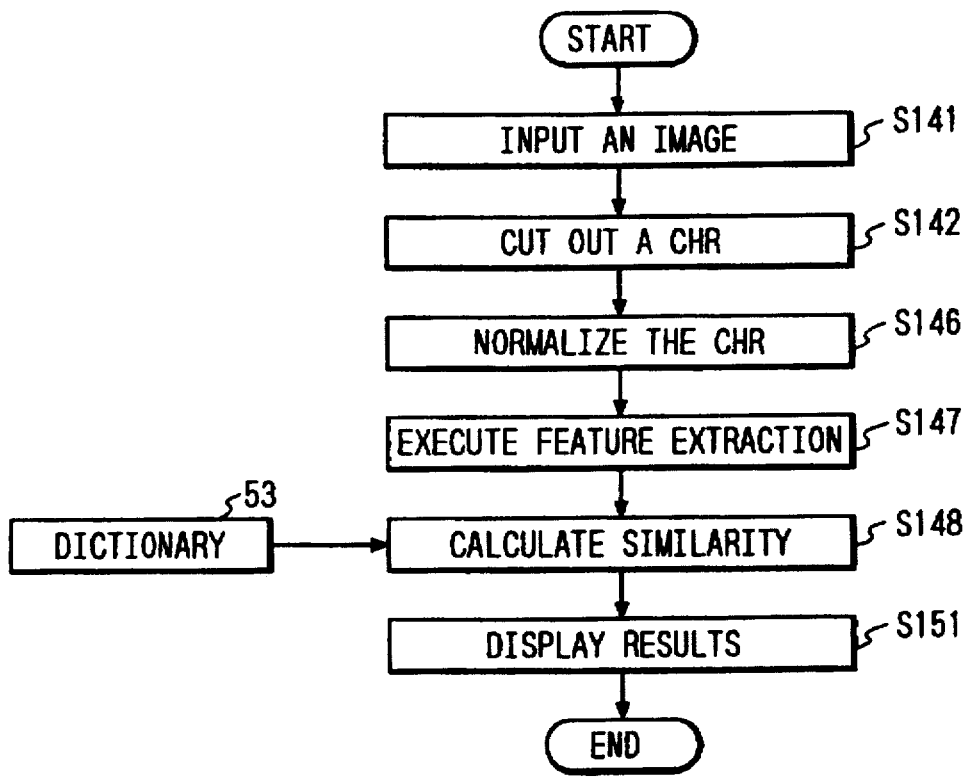
FIG. 13 is a flowchart showing conventional character recognizing processes.

First, in steps S110 to S114, image data which has been read by the image scanner or the like and amplified by the amplifier and binarized by the binarizer 35 is cut out every character by the character cutter 36. After that, a standard character size is calculated in step S118. The standard character size is calculated by, for instance, selecting the character having the maximum height in one line of the characters included in the image data which have been input and binarized. Subsequently, the height of character is set to a standard value (H) in step S120. The value of H is obtained every line. A height of character of each character image to be recognized is set to h. A value of h/H is calculated. The result is stored in a size information storage section 60 in the RAM 40. In step S122, a distance (t) from the upper portion of a character cutting frame 70 to the upper portion of the character image and a distance (b) from the lower portion of the frame 70 to the lower portion of the character image are obtained by using area data of the cutting frame 70 which has been cut out by the character cutter 36 as shown in FIG. 12 and the character height of each character image. The values of t/H and b/H are calculated and the results are stored into a position information storage section 62 in the RAM 40.

Subsequently, for the image data which has been normalized and whose features have been extracted, the character of the maximum similarity is discriminated by using the dictionary 53. After that, a check is made in step S130 to see if such a character needs correction or not. In the discrimination about the necessity of the correction, the character having the maximum similarity which has been selected from the dictionary 53, the size information stored in the size information storage section 60, the position information stored in the position information storage section 62, and decision standard information stored in a decision standard information storage section 64 in the RAM 40 are used and the following discrimination is executed.

For instance, with respect to the character (hereinafter, referred to as a first candidate) having the maximum similarity which has been selected from the dictionary 53, (1) in the case where there are similar characters in which only sizes are different (for instance, "ゃ" (reads "ya") and "や" (also reads "ya"), a threshold value U as decision standard information regarding the size of first candidate character is compared with the value of h/H stored in the size information storage section 60, and if h/H<U, such a character is determined to be a small letter, and if U≦h/H, such a character is decided to be a capital letter.

In the subsequent step S132, if it is determined that the first candidate is a capital letter and the result of the decision indicates a small letter, the similarity decision result is corrected to a small letter. After that, the corrected recognition result is supplied to the display section 44 through the I/O controller 41.

(2) In the case where there are similar characters in which only positions are different (for example, "'" (apostrophe) and "," (comma)), $$p=(t/H)-(b/H)$$

is calculated by the values of t/H and b/H stored in the position information storage section 62, a standard value P (P>0) and Q (Q<0) as decision standard information regarding the position are compared, and if p>P, it is determined that the character exists in the lower portion of the character cutting frame 70, and if p<Q, it is decided that the character exists in the upper portion of the frame 70, and if Q≦p≦P, it is decided that the character exists in the middle portion of the frame 70.

In the next step S132, if the first candidate is a character in the lower portion and the result of the decision indicates a character other than the character in the lower portion, the similarity decision result is corrected by the decision result. After that, the corrected recognition result is supplied to the display section 44 through the I/O controller 41.

Further, after the corrected recognition result was displayed by the display section 44, the error of the recognition result after it was automatically corrected on the basis of the correction decision which had been executed in steps S130 to S132 is manually corrected in step S136. At this time, the user executes the correction of a small letter and a capital letter, the correction of similar characters due to a difference of positions, and the like on the basis of an input from the manual input section 43 while seeing the recognition result displayed by the display section 44. The result which has manually been corrected is again displayed by the display section 44. The decisions about the correction of the small letter and the capital letter which has manually been performed and about the correction of similar characters due to a difference of the positions are reflected to the values of U, P, Q, and the like of the decision standard information and are used in the subsequent processes.

That is, if the manual correction has been performed in step S136, for example, the value of h/H used in step S130 is updated to a new value of U. Due to this, in the next decision, the correct recognition result is generated at the first recognition result display time and there is no need to manually correct the recognition result. In a manner similar to U, each time the correction is manually performed, the values of P and Q are also updated and stored into the decision standard information storage section 64. Thus, the decision standard is learned and there is an effect such that a recognition rate can be raised.

According to the embodiment, for instance, the erroneous recognition can be automatically corrected with respect to not only the similar characters such as Japanese syllabary or alphabetic characters in which only sizes or positions are different but also characters such as "," and "\" or the like in which although the positions and sizes are also different, the character images after completion of the normalization are similar.

On the other hand, although the embodiment has been described with respect to the case where the size and position information in the height direction of the characters have been used as character information to correct the erroneous recognition, the invention is not limited to such a case. For example, the invention can be also applied to the case of using information of a character width in addition to the information in the height direction of the character. In this case, in the standard character size calculation in the embodiment, a character having the maximum width is selected as a standard value (W) from the characters of one line. With respect to characters such as "—" and "–" which cannot be distinguished by only the character height, the discrimination about the correction can be performed on the basis of the value of w/W for a character width (w) and a threshold value of the decision standard information. Further, for instance, the invention can be also applied to the case where the rate of the character height (h) and the character width (w) or an area (h×w) of the rectangle which encloses the character is used as a reference value. Due to this, the correction can be also automatically executed with respect to similar characters such as standard-width character and half-width character or the like in which character widths are different.

Further, although the embodiment has been described with respect to the example in which the standard character size is defined by setting the character height of each line to be maximum, the invention is not limited to such an example. For instance, a character to obtain the standard character size can be also designated by an external input from a manual inputting section such as a mouse or the like.

The invention can be applied to a system comprising a plurality of equipment or can be also applied to an apparatus comprising one equipment. The invention can be also obviously applied to the case where the invention is accomplished by supplying a program to a system or an apparatus.

I claim:

1. An image processing apparatus comprising:

memory means for storing a plurality of character images;

similar character table means for storing in advance, a plurality of image categories, each image category containing images different in relative position characteristic from each other;

recognition means for recognition-processing each of the plurality of character images stored in said memory means so as to obtain a candidate image category for each character image;

determining means for determining whether the obtained candidate category is included in one of the plurality of image categories stored in said similar character table means;

selection means, responsive to a determination by said determining means that the candidate image category obtained for one character image is included in one of the stored image categories, for identifying relative position characteristics of the one character image to a line which includes the one character image and for selecting one image from the plurality of image categories based on the obtained candidate image category and the identified relative position characteristics; and output means, responsive to a determination by said determining means that the candidate image category obtained for one character image is not included in the stored image categories, for outputting the candidate image category obtained by said recognition means as a recognition result for the one character image.

2. An apparatus according to claim 1, further comprising dictionary means for storing plural feature data, each feature data including a character and a category code corresponding thereto.

3. An apparatus according to claim 2, wherein said recognition means compares feature data of the image information with feature data stored in said dictionary means, said recognition means recognizing the category code of the image information as being the category code of the stored feature data having a highest similarity to said feature data of the image information.

4. An apparatus according to claim 1, further comprising dictionary means for storing at least two different patterns in accordance with the position information for each category code.

5. An apparatus according to claim 1, wherein said recognition means recognizes the category code by using feature data of normalized image data.

6. An apparatus according to claim 1, further comprising reception means for receiving the plurality of character images, to be stored in said memory means, from a scanner.

7. An apparatus according to claim 1, further comprising display means for displaying the one category selected by said selection means on a display device.

8. An apparatus according to claim 1, wherein said output means comprises a display device.

9. An image processing apparatus comprising:

memory means for storing a plurality of character images;

similar character table means for storing in advance, a plurality of image categories, each image category containing images different in relative size characteristic from each other;

recognition means for recognition-processing each one of the plurality of character images stored in said memory means so as to obtain a candidate image category for each character image;

determining means for determining whether the obtained candidate category is included in one of the plurality of image categories stored in said similar character table means;

selection means, responsive to a determination by said determining means that the candidate image category obtained for one character image is included in one of the stored image categories, for identifying relative size characteristics of the one character image to a line which includes the one character image and for selecting one image from the plurality of image categories based on the obtained candidate image category and the identified relative size characteristics; and output means, responsive to a determination by said determining means that the candidate image category obtained for one character image is not included in the stored image categories, for outputting the candidate image category obtained by said recognition means as a recognition result for the one character image.

10. An apparatus according to claim 9, further comprising dictionary means for storing plural feature data, each feature data including a character and a category code corresponding thereto.

11. An apparatus according to claim 10, wherein said recognition means compares feature data of the image information with feature data stored in said dictionary means, and recognizes a category code of the image information as being the category code of the stored feature data having a highest degree of similarity.

12. An apparatus according to claim 9, further comprising dictionary means for storing at least two different patterns in accordance with the position information for each category code.

13. An apparatus according to claim 9, wherein said recognition means recognizes the category code by using feature data of normalized image data.

14. An apparatus according to claim 9, further comprising reception means for receiving the plurality of character images, to be stored in said memory means, from a scanner.

15. An apparatus according to claim 9, further comprising display means for displaying the one category selected by said selection means on a display device.

16. An apparatus according to claim 9, wherein said output means comprises a display device.

17. An image processing method using a similar character table in which is stored, for each of plural image categories, plural images which differ in relative position characteristic from each other, said image processing method comprising:

a storing step for storing a plurality of character images;

a recognition step for recognition-processing each of the plurality of character images stored in said storing step so as to obtain a candidate image category for each character image;

a determining step for determining whether the obtained candidate category is included in one of the plurality of image categories stored in the similar character table;

a selection step, responsive to a determination in said determining step that the candidate image category obtained for one character image is included in one of the stored image categories, for identifying relative position characteristics of the one character image to a line which includes the one character image and for selecting one image from the plurality of image categories based on the obtained candidate image category and the identified relative position characteristics; and an output step, responsive to a determination by said determining step that the candidate image category obtained for one character image is not included in the stored image categories, for outputting the candidate image category as a recognition result for the one character image.

18. An image processing method according to claim 17, wherein said determining step comprises the step of comparing the image information with respect to a center height of the character area.

19. An image processing method according to claim 17, further comprising a step of storing plural feature data, each feature data including a character and a category code in association with each other.

20. An apparatus according to claim 19, wherein, said recognizing step comprises a step of comparing feature data of the image information with the stored feature data and a step of recognizing the category code of the image information as being the category code of a stored feature data having a highest similarity to said feature data of the image information.

21. An image processing apparatus according to claim 17, further comprising a step of storing at least two different patterns in accordance with the position information for each category code.

22. An image processing method according to claim 17, wherein, in the recognizing step, the category code is recognized by using feature data of normalized image data.

23. A method according to claim 17, further comprising the step of receiving the plurality of character images to be stored in said storing step, from a scanner.

24. A method according to claim 17, further comprising the step of displaying the selected one category on a display device.

25. A method according to claim 17, wherein said output step outputs the candidate category with a display device.

26. An image processing method using a similar character table in which is stored, for each of plural image categories, plural images which differ in relative size characteristic from each other, said image processing method comprising:

a storing step for storing a plurality of character images;

a recognition step for recognition-processing each one of the plurality of character images stored in said storing step so as to obtain a candidate image category for each character image;

a determining step for determining whether the obtained candidate category is included in one of the plurality of image categories stored in said similar character table;

a selection step, responsive to a determination in said determining step that the candidate image category obtained for one character image is included in one of the stored image categories, for identifying relative size characteristics of the one character image to a line which includes the one character image and for selecting one image from the plurality of image categories based on the obtained candidate image category and the identified relative size characteristics; and an output step, responsive to a determination by said determining step that the candidate image category obtained for one character image is not included in the stored image categories, for outputting the candidate image category obtained in said recognition step as a recognition result for the one character image.

27. An image processing method according to claim 26, wherein, the determining step comprises the step of comparing the image information with respect to a center height of the character area.

28. An image processing method according to claim 26, further comprising a step of storing plural feature data, each feature data including a character and a category code in association with each other.

29. An image processing method according to claim 28, wherein said recognizing step comprises a step of comparing feature data of the image information with the stored feature data, and a step of determining the category code of the image information as being the character code of the stored feature data having a highest similarity to the feature data of the image information.

30. An image processing method according to claim 26, further comprising a step of storing at least two different patterns according to position information for each category, for outputting the candidate category as a recognition result for the one character image.

31. An image processing method according to claim 26, wherein, in the recognizing step, the category code is recognized by using feature data of normalized image data.

32. A method according to claim 26, further comprising the step of receiving the plurality of character images to be stored in said storing step, from a scanner.

33. A method according to claim 26, further comprising the step of displaying the selected one category on a display device.

34. A method according to claim 26, wherein said output step outputs the candidate category with a display device.

35. A computer-readable memory medium storing computer-executable process steps, the steps to use a similar character table in which is stored, for each of plural image categories, plural images which differ in relative position characteristic from each other, the steps comprising:

a storing step to store a plurality of character images;

a recognition step to recognize each of the plurality of character images stored in said storing step so as to obtain a candidate image category for each character image;

a determining step to determine whether the obtained candidate category is included in one of the plurality of image categories stored in the similar character table;

a selection step, responsive to a determination in said determining step that the candidate image category obtained for one character image is included in one of the stored image categories, to identify relative position characteristics of the one character image to a line which includes the one character image and to select one image from the plurality of image categories based on the obtained candidate image category and the identified relative position characteristics; and an output step, responsive to a determination by said determining step that the candidate image category obtained for one character image is not included in the stored image categories, to output the candidate image category as a recognition result for the one character image.

36. A computer-readable memory medium storing computer-executable process steps, the steps to use a similar character table in which is stored, for each of plural image categories, plural images which differ in relative position characteristic from each other, the steps comprising:

a storing step to store a plurality of character images;

a recognition step to recognize each one of the plurality of character images stored in said storing step so as to obtain a candidate image category for each character image;

a determining step to determine whether the obtained candidate category is included in one of the plurality of image categories stored in said similar character table;

a selection step, responsive to a determination in said determining step that the candidate image category obtained for one character image is included in one of the stored image categories, to identify relative size characteristics of the one character image to a line which includes the one character image and to select one image from the plurality of image categories based on the obtained candidate image category and the identified relative size characteristics; and an output step, responsive to a determination by said determining step that the candidate image category obtained for one character image is not included in the stored image categories, to output the candidate image category obtained in said recognition step as a recognition result for the one character image.

* * * * *

UNITED STATES PATENT AND TRADEMARK OFFICE
CERTIFICATE OF CORRECTION

PATENT NO. : 5,729,630
DATED : March 17, 1998
INVENTOR(S) : Hiroaki Ikeda

It is certified that error appears in the above-identified patent and that said Letters Patent is hereby corrected as shown below:

<u>COLUMN 11</u>

Lines 25 and 26 should be deleted.

Signed and Sealed this

Sixteenth Day of March, 1999

Attest:

Attesting Officer

Q. TODD DICKINSON

Acting Commissioner of Patents and Trademarks